(12) United States Patent
Takoh et al.

(10) Patent No.: US 11,055,206 B2
(45) Date of Patent: Jul. 6, 2021

(54) NON-TRANSITORY COMPUTER-READABLE STORAGE MEDIUM, GENERATION METHOD, AND INFORMATION PROCESSING APPARATUS

(71) Applicant: FUJITSU LIMITED, Kanagawa (JP)

(72) Inventors: Yuichiroh Takoh, Machida (JP); Atsushi Kaneko, Kani (JP); Seiya Shindo, Yokohama (JP); Eiji Mizunuma, Yokohama (JP); Hisaya Fujii, Numazu (JP); Yasuhiro Suzuki, Yokohama (JP); Kazutaka Taniguchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 179 days.

(21) Appl. No.: 16/149,200

(22) Filed: Oct. 2, 2018

(65) Prior Publication Data
US 2019/0102283 A1    Apr. 4, 2019

(30) Foreign Application Priority Data

Oct. 4, 2017    (JP) .............................. JP2017-194017

(51) Int. Cl.
*G06F 11/36*    (2006.01)

(52) U.S. Cl.
CPC ...... *G06F 11/3684* (2013.01); *G06F 11/3672* (2013.01); *G06F 11/3688* (2013.01)

(58) Field of Classification Search
CPC .............. G06F 11/3684; G06F 11/302; G06F 11/3688; G06F 11/3672; G06F 11/3636; G06F 11/3072; G06F 11/3668
See application file for complete search history.

(56) References Cited

U.S. PATENT DOCUMENTS

| 7,512,933 B1 * | 3/2009 | Tortosa ............... G06F 11/3672 717/101 |
| 8,151,248 B1 * | 4/2012 | Butler ................. G06F 11/3692 717/124 |
| 2003/0037188 A1 * | 2/2003 | Hagen ................... G06F 13/287 710/28 |

(Continued)

FOREIGN PATENT DOCUMENTS

| JP | 2007-535723 | 12/2007 |
| JP | 2012-80378 | 4/2012 |
| JP | 2016-81256 | 5/2016 |

*Primary Examiner* — Yolanda L Wilson
(74) *Attorney, Agent, or Firm* — Fujitsu Patent Center

(57) ABSTRACT

A non-transitory computer-readable storage medium storing a program that causes a computer to execute a process, the process including executing one of a plurality of programs, acquiring a status of variation in an internal state of a memory occurred in response to the executing, determining whether a specified status pattern is stored in a storage device that stores a plurality of status patterns of variation in an internal state of the memory, the specified status pattern satisfying a predetermined criterion regarding a similarity with the acquired status, when the specified status pattern is stored in the storage device, generating a test scenario that is a combination of programs including the executed program, and when the specified status pattern is not stored in the storage device, suppressing the generating the test scenario.

4 Claims, 17 Drawing Sheets

(56) References Cited

U.S. PATENT DOCUMENTS

| | | | |
|---|---|---|---|
| 2005/0120337 A1* | 6/2005 | Serrano | G06F 11/28 |
| | | | 717/127 |
| 2005/0166094 A1* | 7/2005 | Blackwell | G06F 11/3688 |
| | | | 714/38.14 |
| 2005/0268177 A1* | 12/2005 | John | G11C 29/56008 |
| | | | 714/47.1 |
| 2009/0183143 A1* | 7/2009 | Li | G06F 11/3414 |
| | | | 717/126 |
| 2011/0078666 A1* | 3/2011 | Altekar | G06F 11/3636 |
| | | | 717/131 |
| 2013/0311976 A1* | 11/2013 | Bhat | G06F 11/3676 |
| | | | 717/130 |
| 2015/0026666 A1* | 1/2015 | Tojo | G06F 11/3636 |
| | | | 717/128 |
| 2016/0283359 A1* | 9/2016 | Silverstone | G06F 11/3676 |

* cited by examiner

FIG. 5A

| MEMORY ADDRESS | #1 | #2 | #3 | #4 | #5 | #6 | #7 | #8 | ... |
|---|---|---|---|---|---|---|---|---|---|
| MEMORY STATE | 2 | 3 | 5 | 2 | 1 | 8 | 3 | 2 | ... |

FIG. 5B

| MEMORY ADDRESS | #1 | #2 | #3 | #4 | #5 | #6 | #7 | #8 | ... |
|---|---|---|---|---|---|---|---|---|---|
| MEMORY STATE | 2 | 3 | 5 | 2 | 2 | 8 | 5 | 2 | ... |

MEMORY AREA FOR PROCESS CORRESPONDING TO PROGRAM Px

| STATE BEFORE EXECUTION | EXECUTION PROGRAM | | |
| --- | --- | --- | --- |
| | P1 | P2 | P3 |
| STATE #1 | STATE #1 | STATE #2 | STATE #2 |
| STATE #2 | STATE #2 | STATE #2 | STATE #1 |
| STATE #3 | STATE #3 | STATE #1 | STATE #4 |
| STATE #4 | STATE #2 | STATE #2 | STATE #1 |

※ STATE: COMBINATION OF MEMORY VALUES DETECTED FOR MEMORY ADDRESSES

FIG. 8

| PROGRAM NUMBER | PROGRAM NAME |
|---|---|
| #1 | P1 |
| #2 | P2 |
| ⋮ | ⋮ |
| #n | Pn |

| SCENARIO NUMBER | PROGRAM | NECESSITY TO EXECUTE TEST SCENARIO | STATE AND DEGREE OF INFLUENCE AFTER SCENARIO EXECUTION | DIFFERENCE EVALUATION VALUE | NECESSITY FOR ADDITIONAL SCENARIO |
|---|---|---|---|---|---|
| (STEADY) | NONE | YES | STATE #1 {2,3,5,2,1,8···} | - | YES ※1 |
| #1 | P1 | YES | STATE #1 {2,3,5,2,1,8···} | THRESHOLD OR LESS | NO |
| #2 | P2 | YES | STATE #2 {4,3,9,6,2,1···} | MORE THAN THRESHOLD | YES ※2 |
| #3 | P3 | YES | STATE #2 {4,3,9,6,2,1···} | THRESHOLD OR LESS | NO |
| #4 | P1,* | NO | - | - | - |
| #5 | P2,P1 | YES | STATE #3 {1,8,4,1,7,3···} | MORE THAN THRESHOLD | YES ※3 |
| #6 | P2,P2 | YES | STATE #1 {2,3,5,2,1,8···} | THRESHOLD OR LESS | NO |
| #7 | P2,P3 | YES | STATE #4 {7,4,1,9,4,6···} | MORE THAN THRESHOLD | YES ※4 |
| #8 | P3,* | NO | - | - | - |
| #9 | P2,P1,P1 | YES | STATE #1 {2,3,5,2,1,8···} | THRESHOLD OR LESS | NO |
| ··· | ··· | ··· | ··· | ··· | ··· |

EXECUTION ORDER →

※ * INDICATES WILD CARD
※ EXECUTE */EXECUTE P2 AND */EXECUTE P2, P1, AND */EXECUTE P2, P3, AND *

| MEMORY ADDRESS | #1 | #2 | #3 | #4 | #5 | #6 | #7 | ... |
|---|---|---|---|---|---|---|---|---|
| DEGREE OF INFLUENCE | 2 | 3 | 5 | 2 | 1 | 8 | 3 | ... |

| MEMORY ADDRESS | #1 | #2 | #3 | #4 | #5 | #6 | #7 | ... | AVERAGE VALUE |
|---|---|---|---|---|---|---|---|---|---|
| DIFFERENCE EVALUATION VALUE | 8 | 20 | 6 | 4 | 2 | 16 | 14 | ... | 9.75 |

| SCENARIO NUMBER | PROGRAM | STATE AND DEGREE OF INFLUENCE AFTER SCENARIO EXECUTION |
|---|---|---|
| (STEADY) | NONE | STATE #1 {2,3,5,2,1,8,⋯} |
| #1 | P1 | |
| #2 | P2 | STATE #2 {4,3,9,6,2,1,⋯} |
| #3 | P3 | |

FIG. 14A

| SCENARIO NUMBER | PROGRAM | STATE AND DEGREE OF INFLUENCE AFTER SCENARIO EXECUTION |
|---|---|---|
| (STEADY) | NONE | STATE #1 {2,3,5,2,1,8,⋯} |
| #1 | P1 | |
| #2 | P2 | |
| #3 | P3 | |

⇩

EXECUTE P1 ⇒ DIFFERENCE EVALUATION VALUE IS THRESHOLD OR LESS
⇒ EXECUTE P2 ⇒ DIFFERENCE EVALUATION VALUE IS MORE THAN THRESHOLD

FIG. 14B

| SCENARIO NUMBER | PROGRAM | STATE AND DEGREE OF INFLUENCE AFTER SCENARIO EXECUTION | |
|---|---|---|---|
| (STEADY) | NONE | STATE #1 {2,3,5,2,1,8,⋯} | |
| #1 | P1 | | |
| #2 | P2 | STATE #2 {4,3,9,6,2,1,⋯} | ← WRITE |
| #3 | P3 | | |
| #5 | P2,P1 | | |
| #6 | P2,P2 | | ← ADD |
| #7 | P2,P3 | | |

FIG. 17

| MEMORY ADDRESS | #1 | #2 | #3 | #4 | #5 | #6 | #7 | ... | AVERAGE VALUE |
|---|---|---|---|---|---|---|---|---|---|
| DEGREE OF INFLUENCE (PAST) | 1 | 5 | 2 | 1 | 1 | 12 | 8 | ... | |
| DEGREE OF INFLUENCE (CALCULATION) | 3 | 10 | 5 | 3 | 2 | 4 | 1 | ... | |
| DIFFERENCE | 2 | 5 | 3 | 2 | 1 | 8 | 7 | ... | |
| COEFFICIENT ($\alpha/\beta$) | 4 | 4 | 2 | 2 | 2 | 2 | 2 | ... | |
| DIFFERENCE EVALUATION VALUE (FOR EACH MEMORY ADDRESS) | 8 | 20 | 6 | 4 | 2 | 16 | 14 | ... | 9.75 |

NON-TRANSITORY COMPUTER-READABLE STORAGE MEDIUM, GENERATION METHOD, AND INFORMATION PROCESSING APPARATUS

CROSS-REFERENCE TO RELATED APPLICATION

This application is based upon and claims the benefit of priority of the prior Japanese Patent Application No. 2017-194017, filed on Oct. 4, 2017, the entire contents of which are incorporated herein by reference.

FIELD

The embodiments discussed herein are related to a non-transitory computer-readable storage medium, a generation method, and an information processing apparatus.

BACKGROUND

In system tests for software products and services, a test scenario for verification in which programs to be executed in a system are combined is prepared in order to confirm that there is no problem with operation of the entire system. The programs are executed in accordance with the test scenario to verify whether or not the entire system operates normally.

There is proposed a verification assistance device that is capable of suppressing execution of a verification in which a target device to be verified is repeatedly subjected to similar loads. This verification assistance device acquires the state of operation of a module before and after variation of the values of input parameters that determine operation of the target device, and selects an input parameter that varies the state of operation to a great degree as a main parameter to be set when generating a random verification scenario.

A related technique is disclosed in Japanese Laid-open Patent Publication No. 2016-81256.

SUMMARY

According to an aspect of the embodiments, a non-transitory computer-readable storage medium storing a program that causes a computer to execute a process, the process including executing one of a plurality of programs, acquiring a status of variation in an internal state of a memory occurred in response to the executing, determining whether a specified status pattern is stored in a storage device that stores a plurality of status patterns of variation in an internal state of the memory, the specified status pattern satisfying a predetermined criterion regarding a similarity with the acquired status, when the specified status pattern is stored in the storage device, generating a test scenario that is a combination of programs including the executed program, and when the specified status pattern is not stored in the storage device, suppressing the generating the test scenario.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 5A and 5B illustrate the memory state and variations in the memory state;

FIG. 8 illustrates an example of program information;

FIG. 9 illustrates an example of scenario information;

FIG. 10 illustrates an example of degree-of-influence information;

FIG. 11 illustrates an example of difference evaluation value information;

FIG. 12 illustrates an example of a to-do list;

FIGS. 14A and 14B illustrate initialization and update of the to-do list;

FIG. 17 illustrates an image of calculating the difference evaluation values.

DESCRIPTION OF EMBODIMENTS

Figure 1:
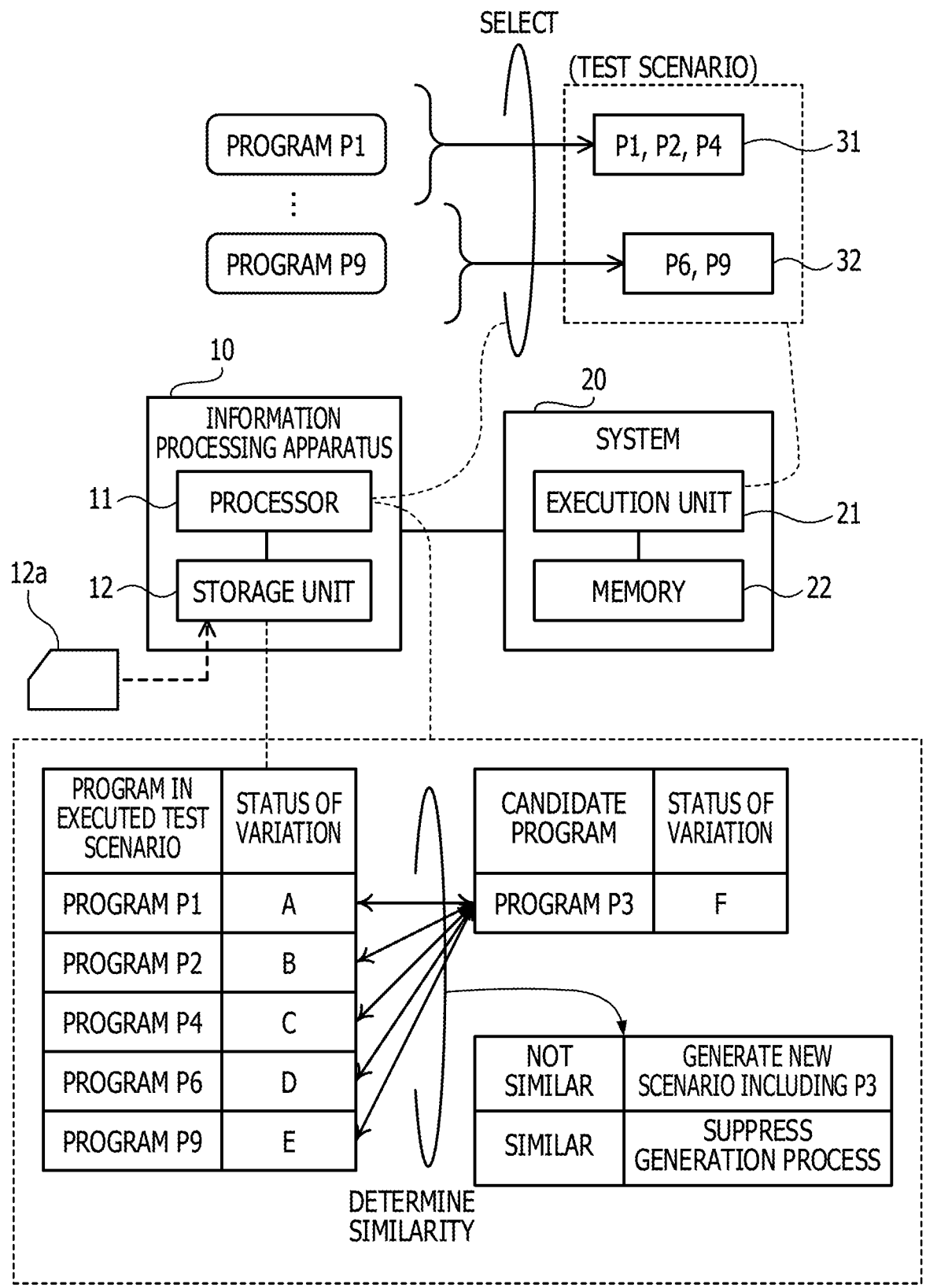
FIG. 1 illustrates an example of an information processing apparatus and a system according to a first embodiment.

Even if the number of programs to be executed in a system is finite, there are an infinite number of combinations of programs that may be set as a test scenario if the same program is executable repeatedly in one test scenario. In practice, a finite number of test scenarios are selected to be executed. In order not to overlook a serious bug or the like, however, a huge number of test scenarios are to be executed for verification, which takes a long time.

According to an aspect, a non-transitory computer-readable storage medium storing a program that causes a computer to execute a process, the process including executing one of a plurality of programs, acquiring a status of variation in an internal state of a memory occurred in response to the executing, determining whether a specified status pattern is stored in a storage device that stores a plurality of status patterns of variation in an internal state of the memory, specified status pattern satisfying a predetermined criterion regarding a similarity with the acquired status, when the specified status pattern is stored in the storage device, generating a test scenario that is a combination of programs including the executed program, and when the specified status pattern is not stored in the storage device, suppressing the generating the test scenario.

Hereinafter, embodiments will be described with reference to the accompanying drawings. Herein and in the drawings, elements that have substantially the same function are occasionally given the same reference numeral to omit redundant description.

1. First Embodiment

A first embodiment will be described with reference to FIG. 1.

FIG. 1 illustrates an example of an information processing apparatus and a system according to the first embodiment. An information processing apparatus 10 illustrated in FIG. 1 is an example of the information processing apparatus according to the first embodiment. A system 20 illustrated in FIG. 1 is an example of the system according to the first embodiment.

As illustrated in FIG. 1, the information processing apparatus 10 includes a processor 11 and a storage unit 12. The system 20 includes an execution unit 21 and a memory 22.

The storage unit 12 and the memory 22 are each a volatile storage device such as a random access memory (RAM) or an non-volatile storage device such as a hard disk drive (HDD) or a flash memory, for example. The processor 11 is a central processing unit (CPU), a digital signal processor (DSP), an application specific integrated circuit (ASIC), a field programmable gate array (FPGA), or the like, for example. The execution unit 21 is a processor such as a CPU, a DSP, an ASIC, or an FPGA, for example.

A generation program that causes the information processing apparatus 10 to execute a process related to generation of a test scenario by controlling operation of the information processing apparatus 10 may be distributed as being stored in a portable storage medium 12a, for example. The information processing apparatus 10 may read the generation program which is stored in the portable storage medium 12a, and store the generation program in the storage unit 12. When the generation program is stored in the storage unit 12, the information processing apparatus 10 may execute the generation program to execute a process related to generation of a test scenario. Examples of the portable storage medium 12a include an optical storage medium, a magnetic storage medium, and a semiconductor memory that is mountable to and removable from a connection interface (not illustrated) of the information processing apparatus 10.

The information processing apparatus 10 executes, with the processor 11, a process of generating a test scenario which is a combination of a plurality of programs selected from programs P1, . . . , and P9 to be executed by the target system 20 to be tested. The programs which are included in the test scenario are executed by the execution unit 21 of the system 20. Examples of the programs which are included in the test scenario include an application programming interface (API).

The processor 11 executes one (candidate program) of the programs P1, . . . , and P9 to acquire the status of variation in the internal state of the memory 22 which is caused by executing the program. In the example in FIG. 1, the processor 11 executes the program P3 as the candidate program. The processor 11 acquires, from the system 20, a status of variation F in the internal state of the memory 22 at the time of execution of the program P3.

The internal state of the memory 22 may be expressed quantitatively using a combination of memory values at various memory addresses or the like, for example. The status of variation may also be expressed quantitatively using the difference between combinations of memory values before and after execution of a program or the like, for example.

The storage unit 12 stores the statuses of variation (status patterns) in the internal state of the memory 22 caused by executing the programs which are included in the test scenario which has been executed. In the example in FIG. 1, the test scenario which has been executed includes the programs P1, P2, P4, P6, and P9, and the storage unit 12 stores statuses of variation A, B, C, D, and E in the internal state of the memory 22 corresponding to such programs, respectively.

The processor 11 references the storage unit 12 to determine whether or not there is any status of variation, the similarity of which to the acquired status of variation F meets a criterion.

In the example in FIG. 1, the processor 11 evaluates the similarity between each of the statuses of variation A, B, C, D, and E and the status of variation F, and determines whether or not there is any status of variation, the similarity of which meets the criterion. If there is no status of variation, the similarity of which meets the criterion, the processor 11 generates a new test scenario that includes the program P3 which has been executed. If there is any status of variation, the similarity of which meets the criterion, on the other hand, the processor 11 suppresses generation of a new test scenario that includes the program P3 which has been executed.

The similarity may be determined based on the difference between the statuses of variation or the like, for example. Examples of the criterion include a predetermined threshold that may be compared with an evaluation value that indicates the difference between the statuses of variation or the like.

For example, in the case where the statuses of variation A and F are similar to each other, the processor 11 suppresses generation of a new test scenario that includes the program P3. In the case where none of the statuses of variation A, B, C, D, and E is similar to the status of variation F, on the other hand, the processor 11 generates a new test scenario that includes the program P3.

Even if a new test scenario obtained by adding a program that does not vary the status of variation of the memory 22 when executed is used for verification, a result that is similar to the result of a verification with a test scenario before addition of the program is obtained, and therefore there is little merit in adding the new test scenario. Rather, by avoiding addition of such a new test scenario, it is possible to reduce the number of test scenarios to be executed in the system 20 while suppressing the risk of overlooking a serious bug or the like.

The first embodiment has been described above.

The scope of application of the technique according to the first embodiment is not limited to the example in FIG. 1, and the information processing apparatus 10 and the system 20 may form one information processing system that generates and executes a test scenario. The processor 11 and the execution unit 21 may be implemented by the same processor or processor group. The storage unit 12 and the memory 22 may be implemented by the same memory element or memory element group. Such modifications also belong to the technical scope of the first embodiment as a matter of course.

2. Second Embodiment

Next, a second embodiment will be described.

Figure 2:
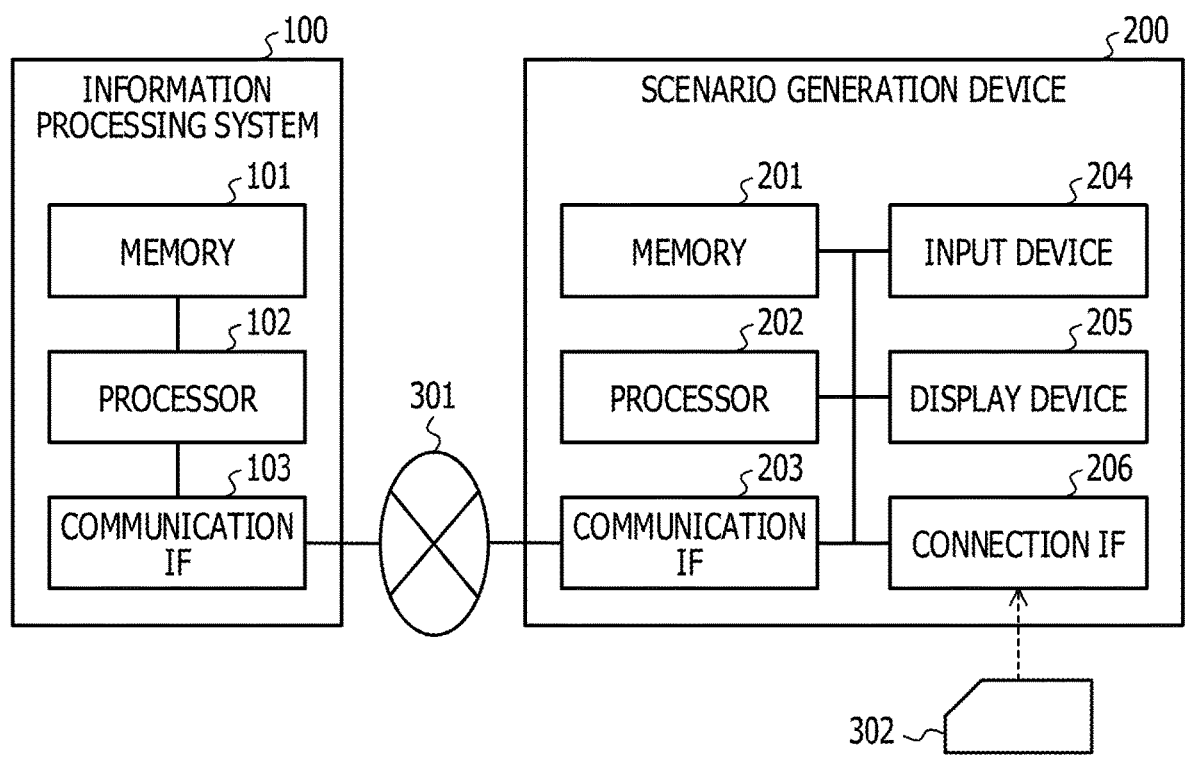
FIG. 2 is a block diagram illustrating an example of an information processing system and a scenario generation device according to a second embodiment.

FIG. 2 is a block diagram illustrating an example of an information processing system and a scenario generation device according to the second embodiment.

An information processing system 100 illustrated in FIG. 2 is an example of the information processing system according to the second embodiment. A scenario generation device 200 illustrated in FIG. 2 is an example of the scenario generation device according to the second embodiment. The information processing system 100 and the scenario generation device 200 are each a computer such as a personal computer (PC) or a server device, for example.

As illustrated in FIG. 2, the information processing system 100 includes a memory 101, a processor 102, and a communication interface 103. The scenario generation device 200 includes a memory 201, a processor 202, a communication interface 203, an input device 204, a display device 205, and a connection interface 206. The information processing system 100 and the scenario generation device 200 are connected to each other via a network 301. A portable storage medium 302 is connectable to the connection interface 206.

In the example in FIG. 2, the information processing system 100 and the scenario generation device 200 are separate from each other. However, the information processing system 100 and the scenario generation device 200 may be constituent elements of the same computer. The information processing system 100 and the scenario generation device 200 may be connected to each other directly, not via the network 301. Such modifications also belong to the technical scope of the second embodiment as a matter of course.

The memories 101 and 201 are each a storage device such as a read only memory (ROM), a RAM, an HDD, a solid state drive (SSD), or a flash memory, for example. The processors 102 and 202 are each a CPU, a DSP, an ASIC, or an FPGA, for example. The processors 102 and 202 may each be a multi-core processor that has a plurality of cores, or may each be a multiprocessor that includes a plurality of processors.

The communication interfaces 103 and 203 are each a communication interface for connection to the network 301. The network 301 is a communication network such as a local area network (LAN) or a wide area network (WAN), for example. The input device 204 is an input interface such as a keyboard, a mouse, a touch panel, or a touch pad, for example. The display device 205 is a display device such as a liquid crystal display (LCD) or an electro-luminescence display (ELD), for example.

The connection interface 206 is a data read/write interface that allows reading of data stored in the portable storage medium 302 which is connected thereto and writing of data into the portable storage medium 302. For example, a program stored in the portable storage medium 302 is read by the processor 202 via the connection interface 206 to be stored in the memory 201. Then, the processor 202 controls operation of the scenario generation device 200 in accordance with the program which is stored in the memory 201.

A generation program that causes the scenario generation device 200 to execute a process related to generation of a test scenario by controlling operation of the scenario generation device 200 may be distributed as being stored in the portable storage medium 302, for example. The scenario generation device 200 may execute a generation program in the memory 201 to execute a process related to generation of a test scenario. Examples of the portable storage medium 302 include an optical storage medium, a magnetic storage medium, and a semiconductor memory.

Figure 3:
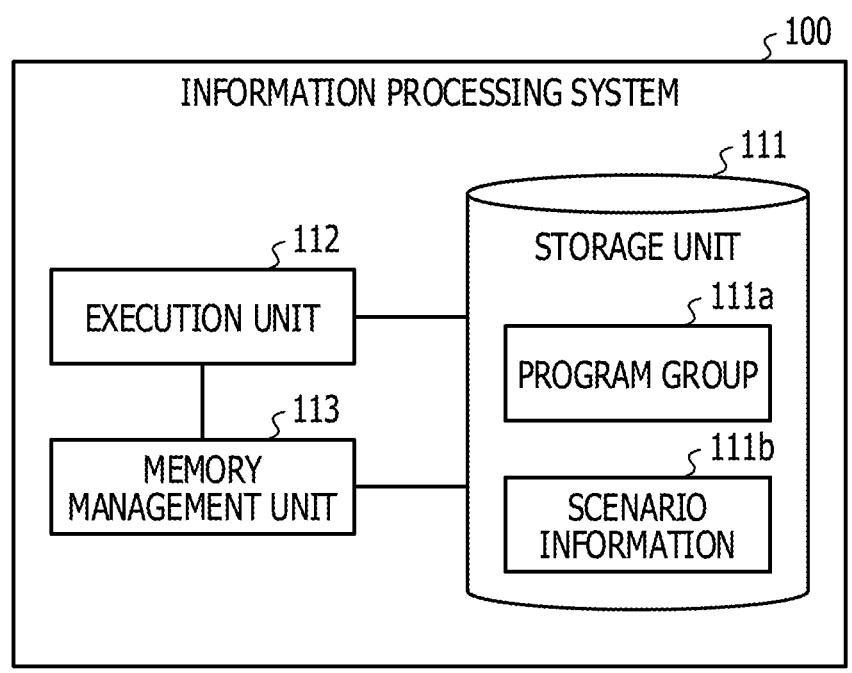
FIG. 3 is a block diagram illustrating an example of the functions of the information processing system according to the second embodiment.

The information processing system 100 has functions illustrated in FIG. 3. FIG. 3 is a block diagram illustrating an example of the functions of the information processing system according to the second embodiment.

The information processing system 100 includes a storage unit 111, an execution unit 112, and a memory management unit 113. The function of the storage unit 111 may be implemented by the memory 101 discussed above. The functions of the execution unit 112 and the memory management unit 113 may be implemented by the processor 102 discussed above.

The storage unit 111 stores a program group 111a and scenario information 111b. The information processing system 100 may acquire, as appropriate, the program group 111a and the scenario information 111b from the scenario generation device 200 through the execution unit 112.

Figure 4:
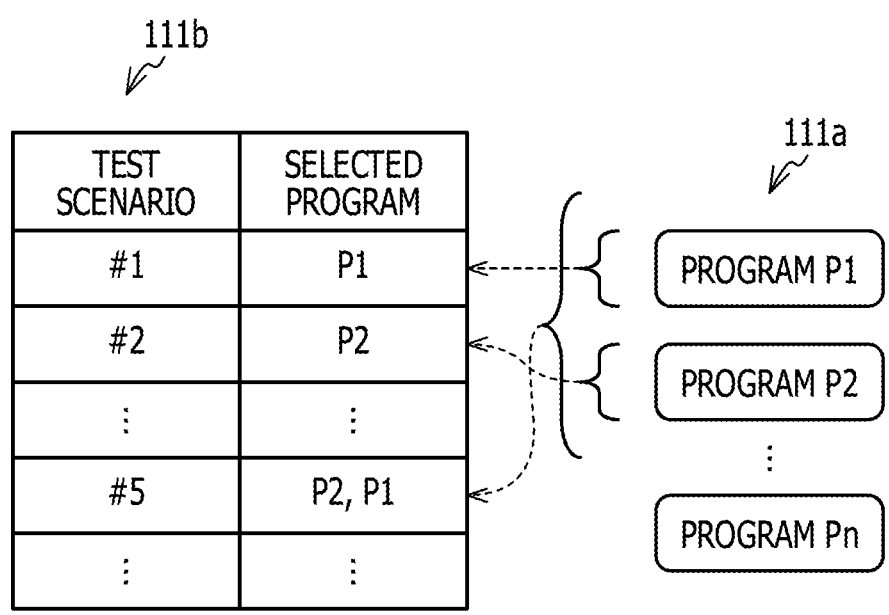
FIG. 4 illustrates an example of a program group and scenario information.

The program group 111a is a collection of programs that may be executed in the information processing system 100, and includes at least one target program to be verified. For example, as illustrated in FIG. 4, the program group 111a includes programs P1, P2, . . . , and Pn. FIG. 4 illustrates an example of the program group and the scenario information. An API is an example of the programs P1, P2, . . . , and Pn.

The scenario information 111b is information related to a test scenario for verification executed in the information processing system 100. For example, the scenario information 111b correlates information (scenario number) for identifying a test scenario and information for identifying a collection of programs included in the test scenario with each other. The test scenario includes at least one program. For example, a test scenario #1 includes the program P1 (selected program) which is selected from the program group 111a.

The execution unit 112 executes a program in accordance with a test scenario. For example, when an instruction to execute a test scenario #5 is received from the scenario generation device 200, the execution unit 112 references the scenario information 111b to sequentially execute the programs P2 and P1. The memory management unit 113 monitors the state (memory state) of the memory 101 before and after execution of a program by the execution unit 112, and provides information on the memory state to the scenario generation device 200 in response to a request from the scenario generation device 200.

The memory state and variations in the memory state are as illustrated in FIGS. 5A and 5B, for example. FIGS. 5A and 5B illustrate the memory state and variations in the memory state. FIG. 5A illustrates the memory state in a state (steady state) in which a program is not executed. On the other hand, FIG. 5B illustrates the memory state during execution of a program Px ($\forall x \in [1, n]$).

The memory state may be expressed using a value (memory value) stored at each memory address of the memory 101. Hereinafter, for convenience of description, the memory state at each memory address will be occasionally represented as a memory value, and a combination of memory values will be occasionally represented as a memory state or simply as a state. When the program Px is executed, a memory area for a process corresponding to the program Px may be varied. The memory state may be varied also in the steady state. The memory management unit 113 monitors such variations in the memory state.

Figure 6:
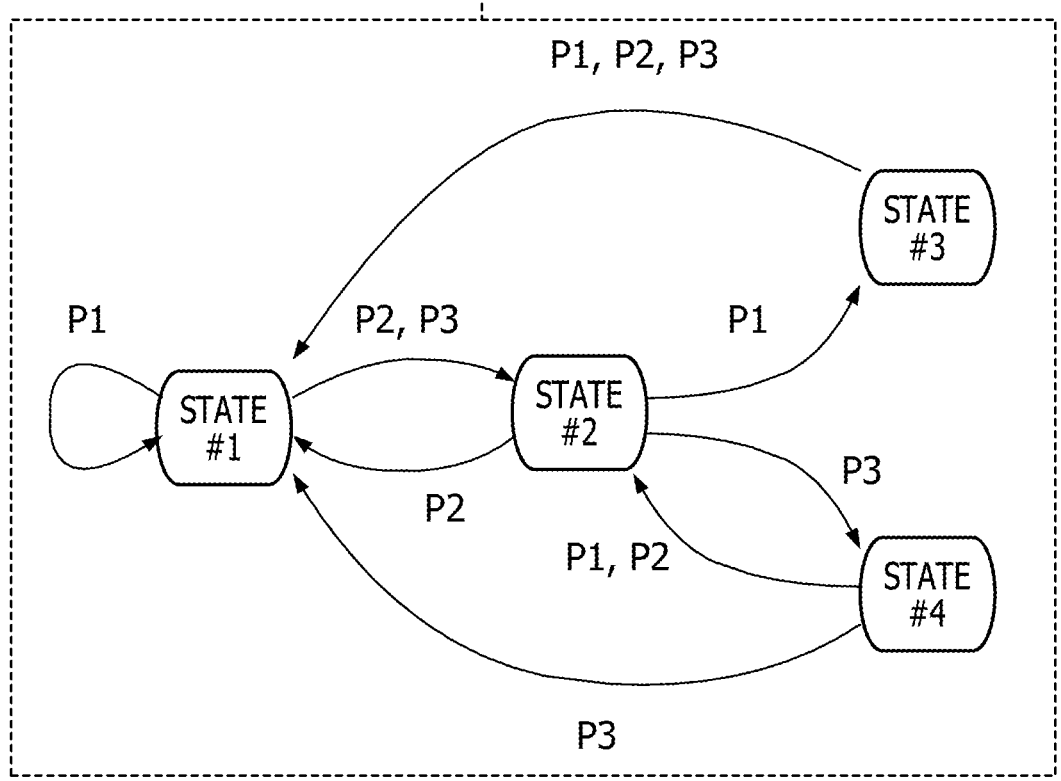
FIG. 6 illustrates state transitions that accompany execution of programs.

State transitions that accompany execution of programs may be expressed as illustrated in FIG. 6. FIG. 6 illustrates state transitions that accompany execution of programs.

The example in FIG. 6 indicates transitions among states #1, #2, #3, and #4. In this example, in the case where the program P1 is executed in the state #1, the state #1 stands again (state maintained). When the program P2 is executed in the state #1, a transition is made to the state #2. When the program P3 is executed in the state #1, a transition is made to the state #2. In this example, a transition is made to the same destination when the programs P2 and P3 are performed in the case where the memory 101 is in the state #1, and therefore it is sufficient to perform a verification using one of the programs P2 and P3.

In the example in FIG. 6, there are three programs (P1, P2, and P3) that cause a transition from the state #1 to the state #3, and there are two programs (P1 and P2) that cause a transition from the state #4 to the state #2. Also for such transitions, it is sufficient to perform a verification using one of the programs. The scenario generation device 200 to be discussed later specifies programs that cause substantially the same transition as in the example described above, and takes measures to reduce the number of test scenarios to be executed based on the specifying result.

Figure 7:
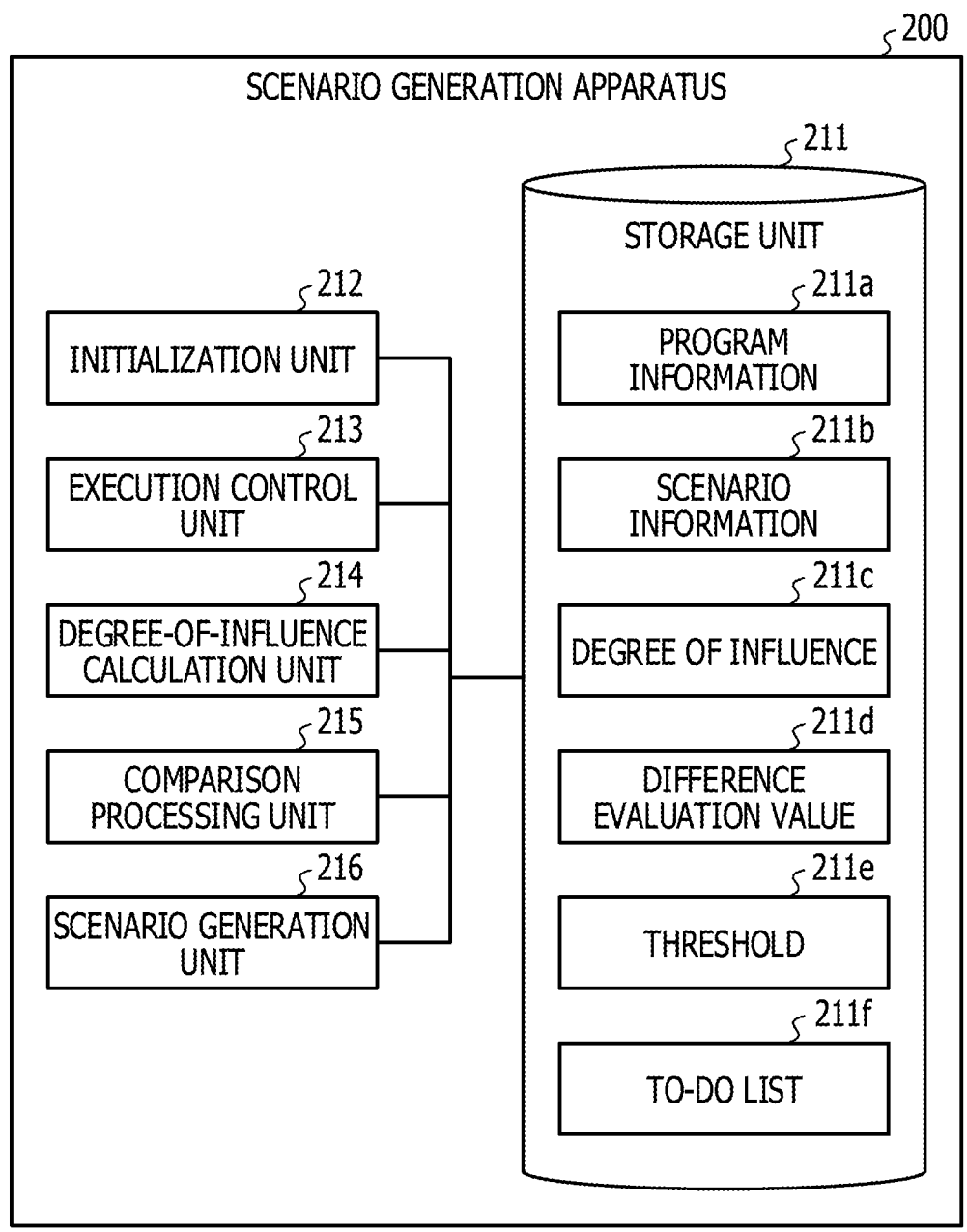
FIG. 7 is a block diagram illustrating an example of the functions of the scenario generation device according to the second embodiment.

The scenario generation device 200 has functions illustrated in FIG. 7. FIG. 7 is a block diagram illustrating an example of the functions of the scenario generation device according to the second embodiment.

The scenario generation device 200 includes a storage unit 211, an initialization unit 212, an execution control unit 213, a degree-of-influence calculation unit 214, a comparison processing unit 215, and a scenario generation unit 216.

The function of the storage unit 211 may be implemented by the memory 201 discussed above. The functions of the initialization unit 212, the execution control unit 213, the degree-of-influence calculation unit 214, the comparison processing unit 215, and the scenario generation unit 216 may be implemented mainly by the processor 202 discussed above.

The storage unit 211 stores program information 211a, scenario information 211b, degree-of-influence information 211c, difference evaluation value information 211d, threshold information 211e, and a to-do list 211f.

The program information 211a includes information on programs that may be executed by the information processing system 100. For example, as illustrated in FIG. 8, the program information 211a includes information in which a program number for identifying a program that may be executed by the information processing system 100 and a program name are correlated with each other. FIG. 8 illustrates an example of the program information.

The scenario information 211b includes information related to a combination (a candidate for a test scenario) of programs that are selectable from the program information 211a. For example, the scenario information 211b has a content illustrated in FIG. 9. FIG. 9 illustrates an example of the scenario information. The content of a portion of the scenario information 211b that overlaps the to-do list 211f to be discussed later is updated along with update of the to-do list 211f. Such an overlapping portion may be omitted.

As illustrated in FIG. 9, the scenario information 211b itemizes information related to test scenarios (combinations of programs) in the ascending order of the number of programs included in the test scenario. The scenario information 211b includes information related to the steady state in the uppermost row.

The scenario information 211b includes information that indicates a scenario number for identifying a test scenario and a collection of programs included in the test scenario. The necessity to execute the test scenario, the state and the degree of influence after execution of the scenario, the difference evaluation value, and the necessity for an additional scenario are set in the course of a process of generating a test scenario for verification.

Test scenarios with "YES" in the "necessity to execute test scenario" field are test scenarios to be executed for verification. Test scenarios with "NO" in the "necessity to execute test scenario" field are test scenarios not to be executed for verification.

The degree of influence and the difference evaluation value are evaluation indices used to determine whether or not the test scenario is to be executed for verification. Calculation of the degree of influence and the difference evaluation value will be discussed later. A portion { . . . } in the "state and degree of influence after scenario execution" field represents the degree of influence. The numerals included in { . . . } represent the numerical values of the degree of influence at the memory addresses. Indications "threshold or less" and "more than threshold" in the "difference evaluation value" field indicate that the difference evaluation value is a predetermined threshold or less and that the difference evaluation value is more than the predetermined threshold, respectively.

Test scenarios with "YES" in the "necessity for additional scenario" field are test scenarios, based on which an additional test scenario (additional scenario) is generated. In the case where "NO" is given in the "necessity for additional scenario" field, no additional scenario is generated based on the corresponding test scenario.

For example, "YES" is given in the "necessity for additional scenario" field for a test scenario (scenario #2) with a scenario number #2. In this case, a test scenario (P2, *) obtained by adding one program to the scenario #2 is generated. The symbol * indicates a wild card. For example, in the case where n is 3, (P2, *) represents three test scenarios (P2, P1), (P2, P2), and (P2, P3) (see scenario numbers #5, #6, and #7 in FIG. 9).

As illustrated in FIG. 10, the degree-of-influence information 211c represents the degree of influence at each memory address. FIG. 10 illustrates an example of the degree-of-influence information. The degree of influence indicates the magnitude (the difference between memory values or the absolute value of such a difference) of variation caused at each memory address before and after execution of a test scenario. The degree-of-influence information 211c is acquired from the information processing system 100, and stored in the storage unit 211. The degree-of-influence information 211c is reflected, as appropriate, in the scenario information 111b or the to-do list 211f to be discussed later.

As illustrated in FIG. 11, the difference evaluation value information 211d represents the difference evaluation value at each memory address. FIG. 11 illustrates an example of the difference evaluation value information. The difference evaluation value is an evaluation value based on the difference between the degree of influence at the time of execution of a test scenario (past scenario) executed in the past and the degree of influence at the time of execution of a program for determining whether or not to generate an additional scenario. The evaluation value represents the degree of similarity between the past scenario and the additional scenario.

The determination as to whether or not to generate an additional scenario is made based on the average value of the difference evaluation values for each memory address, for example. Hereinafter, the difference evaluation value which is calculated for each memory address will be represented as the difference evaluation value, and the average value for the memory addresses will be simply represented as the difference evaluation value.

The threshold information 211e includes a threshold used to determine whether or not to generate an additional scenario through comparison with the difference evaluation value. The threshold may be set beforehand by a user, or may be set in advance based on the result of a simulation performed utilizing sample data, for example.

The to-do list 211f is information that indicates a list of test scenarios set for verification performed by the information processing system 100. As illustrated in FIG. 12, information about the steady state (a record with a scenario number (steady)) and information on the test scenario are registered in the to-do list 211f. FIG. 12 illustrates an example of the to-do list. Update of the to-do list 211f will be discussed later.

FIG. 7 is referenced again. The initialization unit 212 is an element that initializes the to-do list 211f. For example, the initialization unit 212 resets the to-do list 211f, acquires the memory state in the steady state from the information processing system 100, and sets the acquired state to the to-do list 211f. The initialization unit 212 also registers, in the to-do list 211f, a test scenario constituted of one program that is selectable from the program information 211a.

The execution control unit 213 causes the information processing system 100 to execute a program. The degree-of-influence calculation unit 214 acquires the memory state before and after execution of a program from the information processing system 100, calculates the degree of influence, and stores the calculated degree of influence in the storage unit 211 as the degree-of-influence information 211c. The comparison processing unit 215 calculates a difference evaluation value when determining the necessity for an additional scenario, and determines the necessity for an additional scenario by comparing the calculated difference evaluation value and a threshold.

The scenario generation unit 216 adds an additional scenario to the to-do list 211f based on the result of determining the necessity for an additional scenario. When the process of generating the to-do list 211f is completed, the execution control unit 213 causes the information processing system 100 to execute the test scenario which is added to the to-do list 211f for verification.

Figure 13:
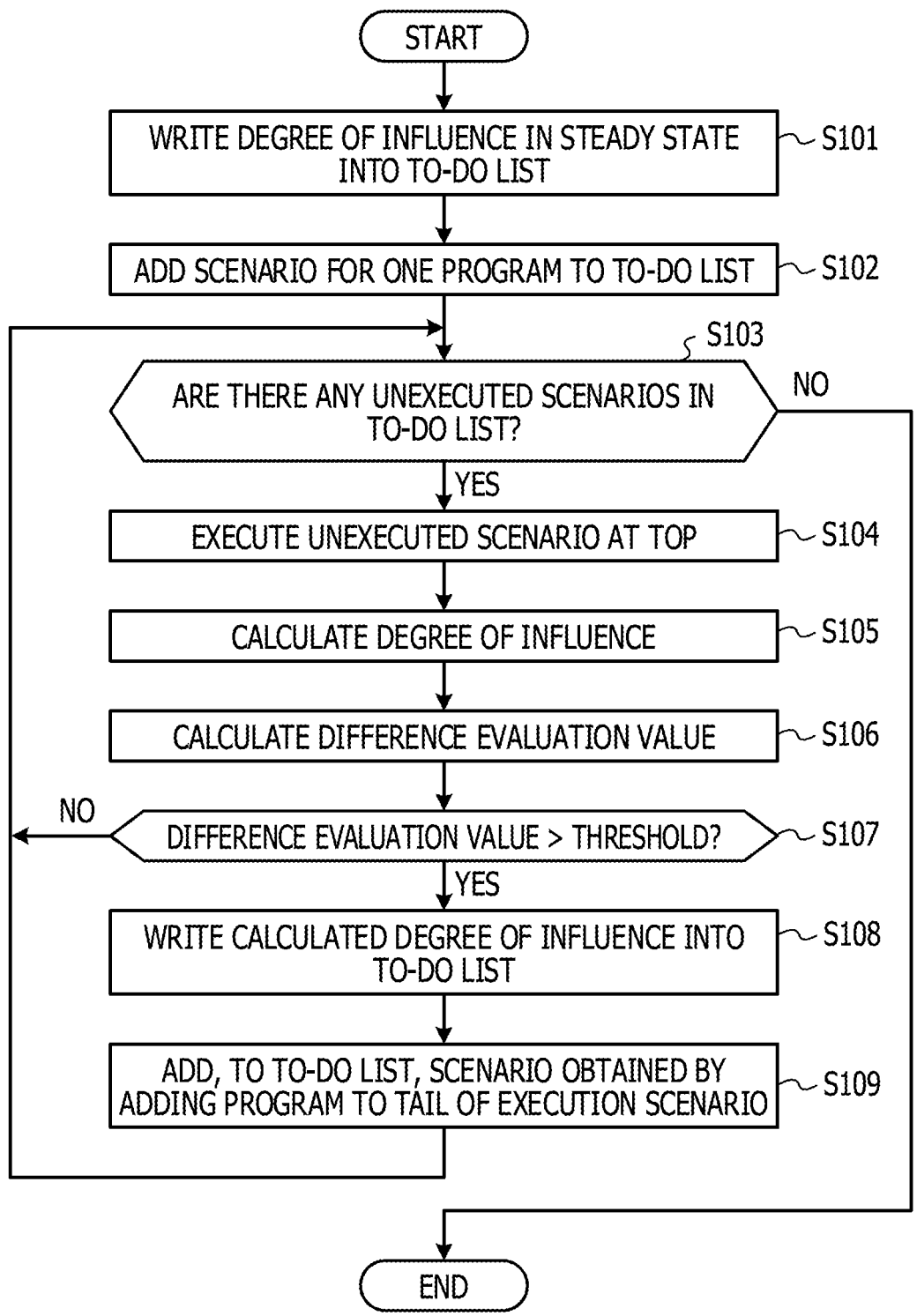
FIG. 13 is a flowchart illustrating the flow of a process executed by the scenario generation device according to the second embodiment.

The scenario generation device 200 described above executes a process illustrated in FIG. 13. FIG. 13 is a flowchart illustrating the flow of a process executed by the scenario generation device according to the second embodiment. FIGS. 14A and 14B are referenced, as appropriate, in the description of FIG. 13. FIGS. 14A and 14B illustrate initialization and update of the to-do list.

(S101) The initialization unit 212 acquires, from the information processing system 100, sampling data on the memory state in the steady state. In this event, the initialization unit 212 acquires sampling data a plurality of times. The sampling data are a collection of memory values at memory addresses of the memory 101, for example. The initialization unit 212 also compares the sampling data for the plurality of times to specify a memory area that is varied in the steady state.

The initialization unit 212 also calculates the degree of influence for each memory address based on the sampling data. For example, in the case where sampling data are acquired twice, the initialization unit 212 calculates the difference between the memory values at the memory addresses, and determines the calculated difference as the degree of influence for each memory address. The initialization unit 212 also sets a record corresponding to the steady state in the uppermost row of the to-do list 211f which has no information on a test scenario, and writes information on the calculated degree of influence (see the uppermost row of the to-do list 211f in FIG. 14A).

(S102) The initialization unit 212 selects one program at a time from the program information 211a, and sets a test scenario that includes the one selected program. Then, the initialization unit 212 writes information on the set test scenario in the to-do list 211f.

For example, in the case where n is 3, the initialization unit 212 sets a scenario (scenario #k) with a scenario number #k that includes a program Pk (k=1, 2, 3), and writes information on the scenario #k in the to-do list 211f (see FIG. 12). In this case, information on scenario numbers and programs included in the test scenarios are written into the to-do list 211f (see the three lower rows of the to-do list 211f in FIG. 14A).

(S103) The execution control unit 213 determines whether or not there are any test scenarios (unexecuted scenarios) that have not been executed yet in the to-do list 211f. In the process in FIG. 13, the execution control unit 213 causes the information processing system 100 to execute test scenarios sequentially from the top of the to-do list 211f. In the case where there are any unexecuted scenarios, the process proceeds to S104. In the case where all the test scenarios in the to-do list 211f have been executed, on the other hand, the sequence of processes illustrated in FIG. 13 is ended.

(S104) The execution control unit 213 causes the information processing system 100 to execute an unexecuted scenario that is at the top of the unexecuted scenarios in the to-do list 211f. In the information processing system 100 which has received a request to execute an unexecuted scenario, the processor 102 executes a program in the unexecuted scenario, and the memory management unit 113 samples sampling data on the memory state during execution of the program.

(S105) The degree-of-influence calculation unit 214 acquires, from the information processing system 100, the sampling data which are sampled during execution of the unexecuted scenario. The degree-of-influence calculation unit 214 also calculates a degree of influence based on the sampling data which are acquired from the information processing system 100. For example, the degree-of-influence calculation unit 214 calculates the difference between the memory values at each memory address before and after execution of the unexecuted scenario, and determines the calculated difference as the degree of influence for each memory address. The degree-of-influence calculation unit 214 stores the calculated degree of influence in the storage unit 211.

(S106) The comparison processing unit 215 calculates a difference evaluation value based on the degree of influence which is stored in the storage unit 211 by the degree-of-influence calculation unit 214 in the past and the degree of influence which is calculated by the degree-of-influence calculation unit 214 in the preceding S105. In this event, the comparison processing unit 215 may utilize, for calculation, the degree of influence at each memory address of the memory area excluding memory areas with a memory state varied in the steady state. By excluding memory areas with a memory state varied in the steady state, it is possible to suppress an influence due to fluctuations in the memory state that are irrelevant to execution of the unexecuted scenario. Calculation of the difference evaluation value will be discussed later.

(S107) The comparison processing unit 215 references the threshold information 211e, and determines whether or not the calculated difference evaluation value is more than a threshold (difference evaluation value>threshold). In the case where "difference evaluation value >threshold" is met, the process proceeds to S108. In the case where "difference evaluation value>threshold" is not met, on the other hand, the process proceeds to S103.

(S108) The comparison processing unit 215 writes information on the degree of influence which is calculated by the degree-of-influence calculation unit 214 for the unexecuted scenario into the to-do list 211f.

(S109) The scenario generation unit 216 generates a test scenario (additional scenario) obtained by adding one program to the tail of the unexecuted scenario (execution scenario) that has been executed currently.

For an execution scenario with a difference evaluation value that is not more than the threshold as determined in S107, information on the degree of influence is not written into the to-do list 211f, and an additional scenario is not generated. For example, in the case where the difference evaluation value of the scenario #1 which includes only the program P1 is not more than the threshold, the "state and degree of influence after scenario execution" field is left blank as indicated in the to-do list 211f in FIG. 14B. For an execution scenario with a difference evaluation value that is more than the threshold, on the other hand, information on the degree of influence is not written into the to-do list 211f, and an additional scenario is generated.

For example, in the case where the execution scenario is the scenario #2 and the difference evaluation value for the scenario #2 is more than the threshold, the scenario generation unit 216 generates three additional scenarios by adding a program Pk (k=1, 2, 3) to the program P2 which is included in the scenario #2 (see the three lower rows in the to-do list 211f in FIG. 14B).

When the process in S109 is completed, the process proceeds to S103.

A process related to calculation of a difference evaluation value will be further described with reference to FIGS. 15 and 16.

Figure 15:
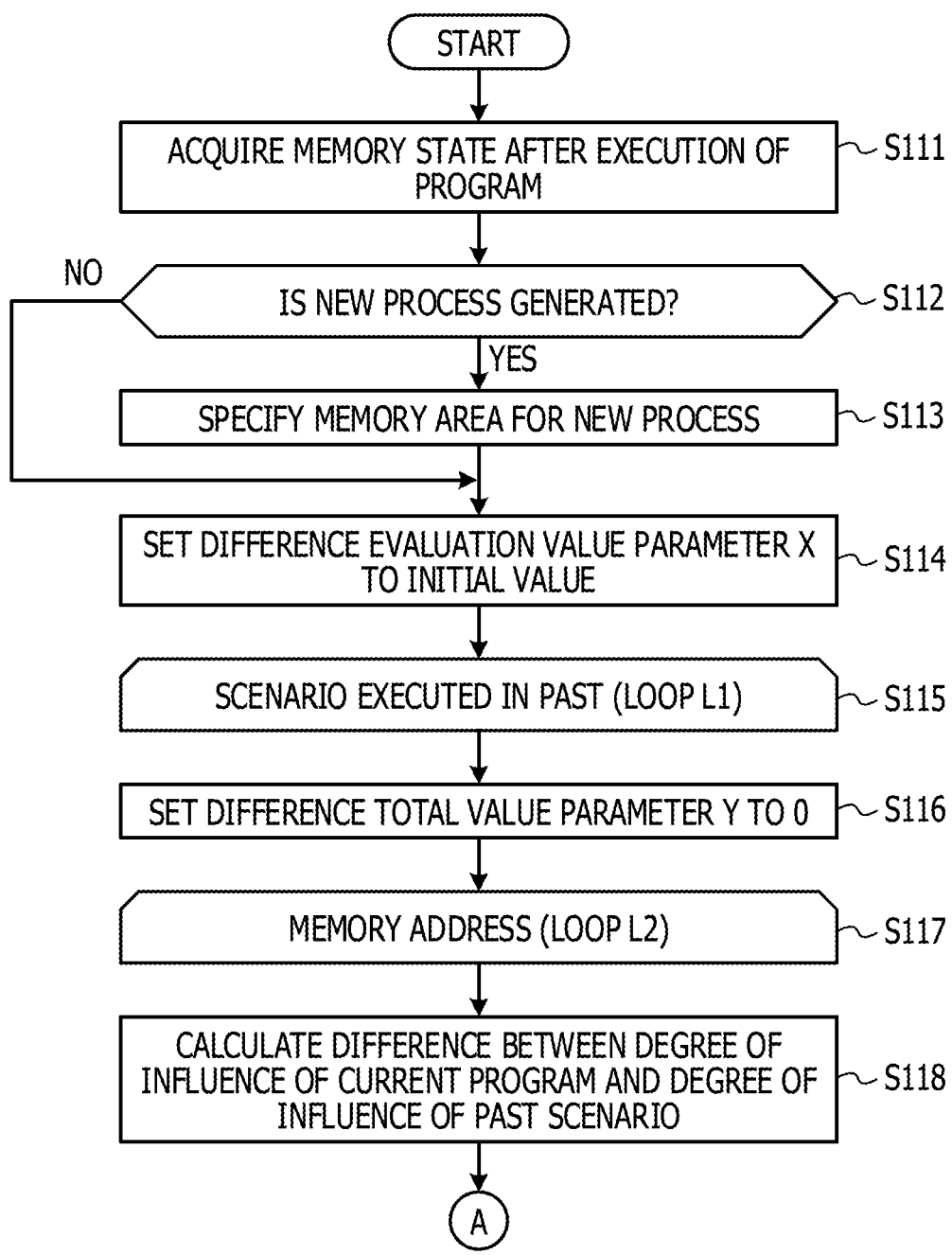
FIG. 15 is a first flowchart illustrating the flow of a process related to calculation of difference evaluation values, of the process executed by the scenario generation device according to the second embodiment.
Figure 16:
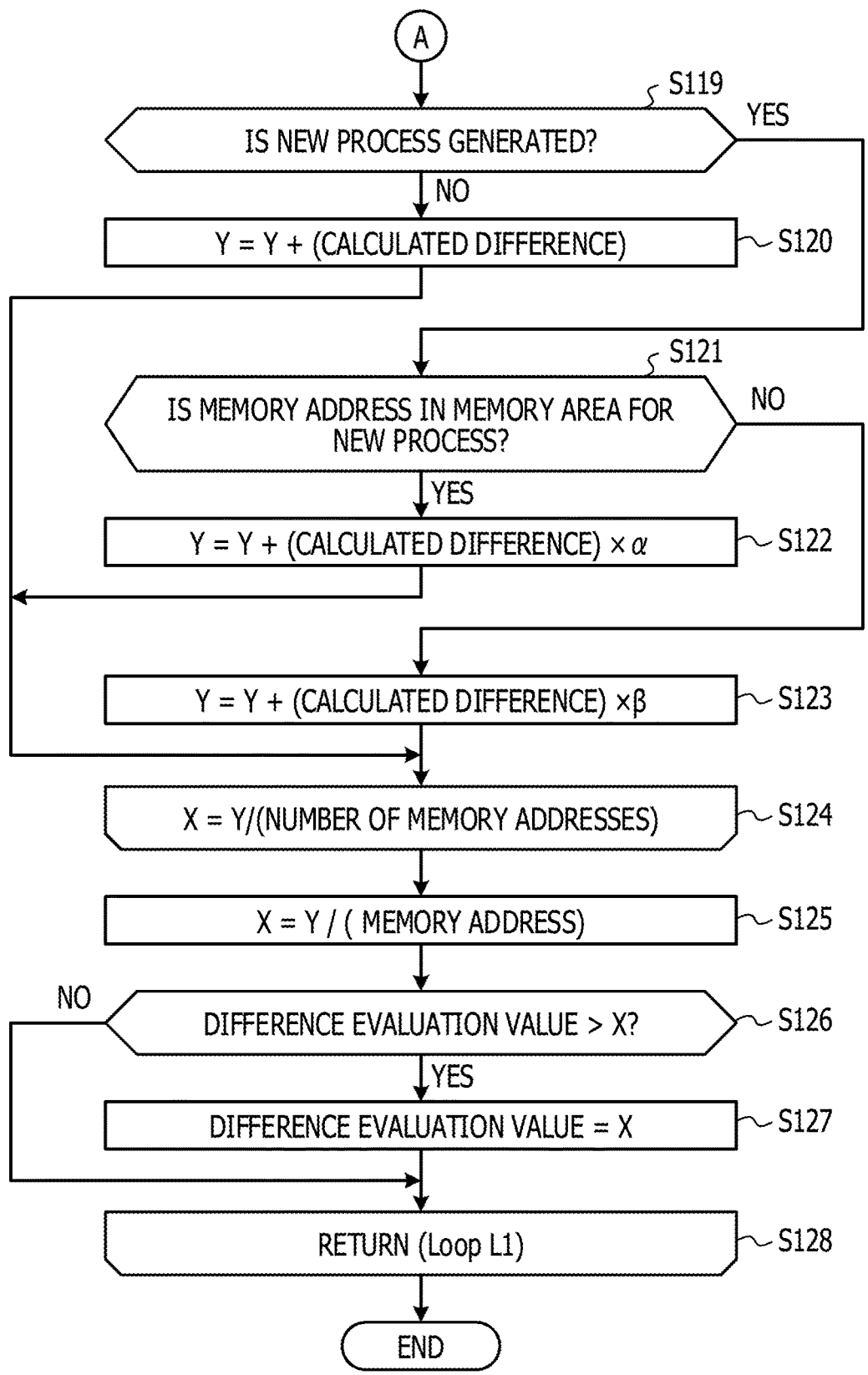
FIG. 16 is a second flowchart illustrating the flow of the process related to calculation of difference evaluation values, of the process executed by the scenario generation device according to the second embodiment.

FIG. 15 is a first flowchart illustrating the flow of a process related to calculation of difference evaluation values, of the process executed by the scenario generation device according to the second embodiment. FIG. 16 is a second flowchart illustrating the flow of a process related to calculation of difference evaluation values, of the process executed by the scenario generation device according to the second embodiment.

(S111) The comparison processing unit 215 acquires, from the information processing system 100, a memory state after execution of a program in an unexecuted scenario.

(S112) The comparison processing unit 215 determines whether or not a new process is generated through execution of the program. For example, the comparison processing unit 215 acquires, from the information processing system 100, information that indicates whether or not a new process is generated. In the case where a new process is generated, the process proceeds to S113. In the case where a new process is not generated, on the other hand, the process proceeds to S114.

(S113) The comparison processing unit 215 specifies a memory area (see FIG. 5) for the new process. For example, the comparison processing unit 215 specifies a memory area for the new process from a memory descriptor. The memory descriptor stores information (such as information on a page table and a memory region) related to a virtual memory space for the process. The memory descriptor stores information related to an address space for the process, and one memory descriptor may be allocated to one process, for example.

(S114) The comparison processing unit 215 sets a difference evaluation value parameter X (temporary variable) to an initial value (for example, the largest value that the difference evaluation value may take; a predetermined value).

(S115, S128) The comparison processing unit 215 repeatedly executes processes between S115 and S128 (Loop L1) while selecting one of the test scenarios (executed scenarios) executed in the past with reference to referencing the to-do list 211f until there are no unselected executed scenarios. When there are no unselected executed scenarios in S128, the sequence of processes illustrated in FIGS. 15 and 16 is ended.

(S116) The comparison processing unit 215 sets a difference total value parameter Y (temporary variable) to 0.

(S117, S124) The comparison processing unit 215 repeatedly executes processes between S117 and S124 (Loop L2) while selecting one of the memory addresses in the target memory areas sequentially from the top of the memory 101 until there are no unselected memory addresses. When there are no unselected memory addresses in S124, the process proceeds to S125. The target memory areas may be set to all the areas of the memory 101, or memory areas excluding areas with a memory state varied in the steady state, for example.

(S118) The comparison processing unit 215 calculates a difference between the degree of influence of the executed program (current program) and the degree of influence of the executed scenario (past scenario) which is selected in S115. When the process in S118 is completed, the process proceeds to S119 (FIG. 16).

(S119) The comparison processing unit 215 determines whether or not a new process is generated at the time of execution of the current program. In the case where a new process is generated, the process proceeds to S121. In the case where a new process is not generated, on the other hand, the process proceeds to S120.

(S120) The comparison processing unit 215 executes a process of adding the difference which is calculated in S118 to Y (Y=Y+(calculated difference)). When the process in S120 is completed, the process proceeds to S124.

(S121) The comparison processing unit 215 determines whether or not the memory address which is selected in S117 is in the memory area for the new process. In the case where the selected memory address is in the memory area for the new process, the process proceeds to S122. In the case where the selected memory address is not in the memory area for the new process, the process proceeds to S123.

(S122) The comparison processing unit 215 executes a process of multiplying the difference which is calculated in S118 with a coefficient α and adding the product to Y (Y=Y+(calculated difference)×α). The coefficient α is a value set beforehand that is one or more, and is set to a value that is more than a coefficient β to be discussed later. When the process in S122 is completed, the process proceeds to S124.

(S123) The comparison processing unit 215 executes a process of multiplying the difference which is calculated in S118 with a coefficient β and adding the product to Y (Y=Y+(calculated difference)×β). The coefficient β is a value set beforehand that is one or more, and is set to a value that is less than the coefficient α. When the process in S123 is completed, the process proceeds to S124.

(S125) The comparison processing unit 215 performs a computation of dividing Y by the number of memory addresses (Y/(number of memory addresses)), and sets the computation result to X (X=Y/(number of memory addresses)). At the stage of S125, Y corresponds to the total value of the differences at the memory addresses. In addition, the computation in S125 corresponds to a computation of calculating the average value of the differences at the memory addresses. That is, X which is set in S125 is the average value of the differences.

(S126) The comparison processing unit 215 compares the difference evaluation value which is already set and X, and determines whether or not the difference evaluation value is more than X (whether or not "difference evaluation value>X" is met). In the case where "difference evaluation value>X" is met, the process proceeds to S127. In the case where "difference evaluation value >X" is not met, on the other hand, the process proceeds to S128.

(S127) The comparison processing unit 215 sets X to the difference evaluation value (difference evaluation value=X). When the process in S127 is completed, the process proceeds to S128.

In the second embodiment, as described above, the process is divided in accordance with whether or not a new process is generated at the time of execution of the program, and in the case where a new process is generated, the weight of the degree of influence is varied between a memory area for the new process and other memory areas. When expressed using formulas, the difference evaluation value is expressed by the formulas (1) and (2) below.

The formula (1) below indicates a difference evaluation value (V1) for a case where a new process is generated. The formula (2) below indicates a difference evaluation value (V2) for a case where a new process is not generated. In the formula (1) below, the memory address is represented as m, the memory area for the new process is represented as M1, the memory areas other than M1 are represented as M2, and all the memory areas are represented as M3 (M3=M1∪M2). In the formulas (1) and (2) below, the degree of influence of a current program at the memory address m is represented as Ec(m), and the degree of influence of a past scenario at the memory address m is represented as Ep(m).

$$V1 = \sum_{m \in M1} |Ec(m) - Ep(m)| \times \alpha + \sum_{m \in M2} |Ec(m) - Ep(m)| \times \beta \quad (1)$$

$$V2 = \sum_{m \in M3} |Ec(m) - Ep(m)| \quad (2)$$

The above scheme is based on the idea that, in the case where a new process is generated at the time of execution of a program, the degree of influence in the memory area for the new process is important for calculation of a difference evaluation value. The above scheme is also based on the idea that variations in the memory area for the existing process caused at the same timing as generation of the new process are also important. Therefore, the coefficients α and β are each set to a value that is one or more, and the relationship (α>β) between the coefficients is prescribed in consideration of the degree of importance.

Calculation of the difference evaluation value will be additionally described with reference to FIG. 17. FIG. 17 illustrates an image of calculating the difference evaluation values. The example in FIG. 17 indicates an image of calculation for a case where a new process is generated at the time of execution of the current program.

As illustrated in FIG. 17, the comparison processing unit 215 calculates the difference between the degree of influence (degree of influence (past)) for each memory address calculated when a test scenario was executed in the past and the degree of influence (degree of influence (calculation)) for each memory address calculated at the time of execution of the current program.

The comparison processing unit 215 selects one of the coefficients α and β in accordance with whether or not each memory address is in the memory area for a new process. The coefficient α is selected for a memory address that is in the memory area for a new process. The coefficient β is selected for a memory address that is outside the memory area for a new process. In the example in FIG. 17, the coefficient α is selected for the memory addresses #1 and #2, and the coefficient β is selected for the memory addresses #3 to #7.

The comparison processing unit 215 multiplies the calculated difference and the selected coefficient for each memory address, and determines the product as the difference evaluation value for each memory address. The comparison processing unit 215 also averages the difference evaluation values for all the target memory addresses. The comparison processing unit 215 sets the calculated average value to the difference evaluation value which is used to determine whether or not to add a test scenario to the to-do list 211f. The difference evaluation value is calculated in this manner.

The second embodiment has been described above.

As discussed already, even if a new test scenario obtained by adding a program that does not vary the status of variation of the memory state when executed is used for verification, a result that is similar to the result of a verification with a test scenario before addition of the program is obtained, and therefore there is little merit in adding the new test scenario. Rather, by avoiding addition of such a new test scenario, it is possible to reduce the number of test scenarios to be executed in the information processing system 100 while suppressing the risk of overlooking a serious bug or the like. The technique according to the second embodiment discussed above contributes to reducing the number of such test scenarios.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
executing one of a plurality of programs;
acquiring a status of variation in an internal state of a memory occurred in response to the executing;
determining whether a specified status pattern is stored in a storage device that stores a plurality of status patterns of variation in an internal state of the memory, the specified status pattern satisfying a predetermined criterion regarding a similarity with the acquired status;

when the specified status pattern is stored in the storage device, generating one or more first test scenarios which are a combination of programs including the executed program;

when a specific program resulting from a plurality of executed programs included in the plurality of programs is a same program, generating, from the first test scenarios, one or more second test scenarios by reducing a number of test scenarios related to the specific program; and when the specified status pattern is not stored in the storage device, suppressing the generating the one or more second test scenarios.

2. The non-transitory computer-readable storage medium according to claim 1, wherein the determining includes:

determining whether the specified status pattern is stored with a first weight given to the status of variation for a first memory region for a process corresponding to the executed program; and determining whether the specified status pattern is stored with a second weight that is less than the first weight given to the status of variation for a memory region other than the first memory region.

3. A generation method executed by a computer, the generation method comprising:

executing one of a plurality of programs;

acquiring a status of variation in an internal state of a memory occurred in response to the executing;

determining whether a specified status pattern is stored in a storage device that stores a plurality of status patterns of variation in an internal state of the memory, the specified status pattern satisfying a predetermined criterion regarding a similarity with the acquired status;

when the specified status pattern is stored in the storage device, generating one or more first test scenarios which are a combination of programs including the executed program;

when a specific program resulting from a plurality of executed programs included in the plurality of programs is a same program, generating, from the first test scenarios, one or more second test scenarios by reducing a number of test scenarios related to the specific program; and when the specified status pattern is not stored in the storage device, suppressing the generating the one or more second test scenarios.

4. An information processing apparatus comprising:

a memory; and a processor coupled to the memory and the processor configured to execute a process, the process including:

executing one of a plurality of programs;

acquiring a status of variation in an internal state of a memory occurred in response to the executing;

determining whether a specified status pattern is stored in a storage device that stores a plurality of status patterns of variation in an internal state of the memory, the specified status pattern satisfying a predetermined criterion regarding a similarity with the acquired status;

when the specified status pattern is stored in the storage device, generating one or more first test scenarios which are a combination of programs including the executed program;

when a specific program resulting from a plurality of executed programs included in the plurality of programs is a same program, generating, from the first test scenarios, one or more second test scenarios by reducing a number of test scenarios related to the specific program; and when the specified status pattern is not stored in the storage device, suppressing the generating the one or more second test scenarios.

\* \* \* \* \*